United States Patent
Jasinski

[11] 3,961,842
[45] June 8, 1976

[54] REGENERATING ELECTRODE FOR ELECTROCHROMIC DISPLAY CELL

[75] Inventor: Raymond J. Jasinski, Dallas, Tex.

[73] Assignee: Texas Instruments Incorporated, Dallas, Tex.

[22] Filed: Sept. 20, 1974

[21] Appl. No.: 507,896

[52] U.S. Cl............................ 350/160 R; 340/336
[51] Int. Cl.² ........................................ G02F 1/28
[58] Field of Search............... 350/160 R; 204/299, 204/181; 96/1 PE; 340/336

[56] References Cited
UNITED STATES PATENTS

| | | | |
|---|---|---|---|
| 3,736,043 | 5/1973 | Sambucetti | 350/160 R |
| 3,806,229 | 4/1974 | Schoot et al. | 350/160 R |
| 3,843,232 | 10/1974 | Berets | 350/160 R |
| 3,854,794 | 12/1974 | Van Dam et al. | 350/160 R |

Primary Examiner—John K. Corbin
Assistant Examiner—Jon W. Henry
Attorney, Agent, or Firm—Harold Levine; James T. Comfort; James O. Dixon

[57] ABSTRACT

Disclosed is an improved electrochromic optical display cell having a memory, long life, good contrast independent of viewing angle, reversibility, low switching voltage, and a low mean power consumption wherein a soluble colorless dye is selectively and reversibly reduced at a display electrode to form an insoluble, insulating film that markedly absorbs visible light. The electrochromic display cell includes an electrode through which a potential is applied across the cell to regenerate the coulombic capacity of the counter electrode. The counter electrode is regenerated by reverse electrolysis without deleteriously affecting cell operation. In a preferred embodiment, the regeneration electrode is palladium.

In another embodiment, the display electrode normally present in the display cell is utilized as the regeneration electrode. The potential applied across the cell for regeneration is larger than the normal potential applied to erase the cell.

15 Claims, 4 Drawing Figures

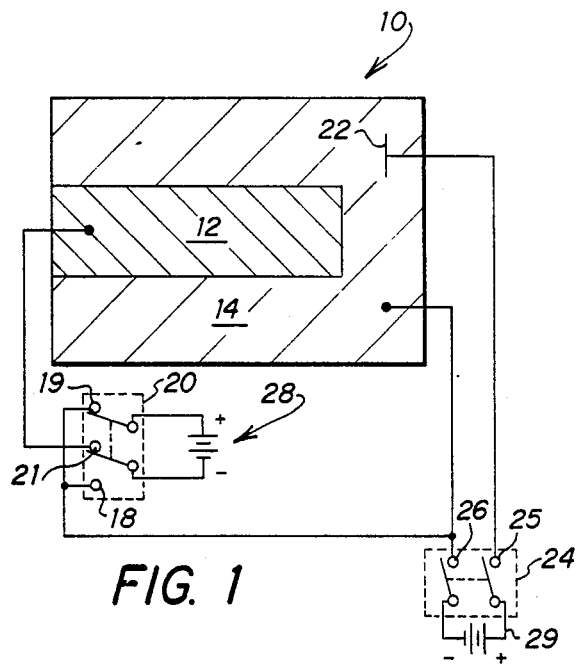
FIG. 1
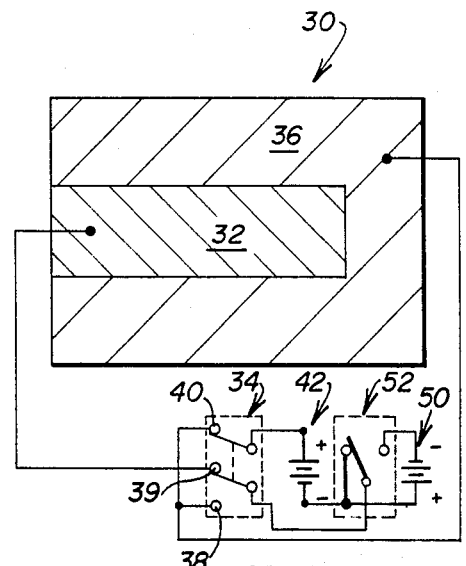
FIG. 2
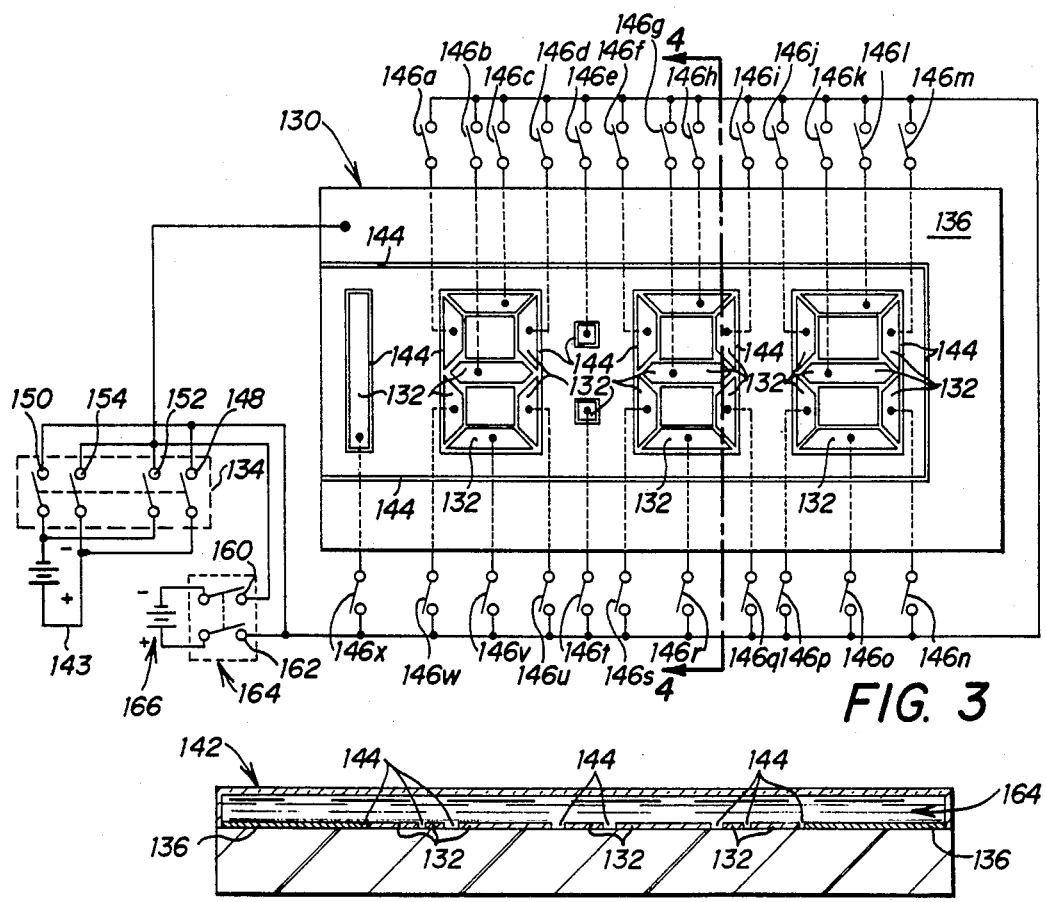
FIG. 3
FIG. 4

REGENERATING ELECTRODE FOR ELECTROCHROMIC DISPLAY CELL

This invention relates to regeneration of a counter electrode in an electrochromic optical display cell, and more particularly to applying a potential to a sealed electrochromic cell sufficient to restore the coulombic capacity of the electrode without deleteriously affecting the closed system.

The use of electrochromics for optical display is of relatively recent origin. The concept of electrochromics involves the reversible oxidation and reduction of an organic soluble ionic substance in an electrolytic cell to form an insoluble, colored film at one of the electrodes.

In one electrochromic cell, a potential is applied reversibly reducing a soluble, colorless dye at a display electrode. The reduced dye is plated on the display electrode forming an insulating, insoluble, adherent film. The formed film markedly absorbs visible light and conforms to the surface shape of the display electrode. Thus, an optically discernible chromic display, configured in a shape corresponding to the energized display electrode may be reversibly "written".

Upon applying a reverse current through the cell, the colored film is oxidized at the display electrode. Once oxidized, the insoluble colored film again becomes a soluble colorless ion. The previously optically discernible display is thus "erased". By alternatively reversing the current flow within the cell an optical display may be written and erased many times.

Electrochromic cells are preferred for use as optical displays for a number of reasons. Once reduced, the insoluble dye has a "memory". That is, the reduced insoluble colored dye remains reduced on the display electrode until subsequently oxidized, notwithstanding the removal of reducing current flow. Further, because the cell itself has a threshold potential, multiplexing of many display electrodes is possible. Such multiplexing diminishes the number of electrodes as well as the complexity and the components of the current supplying system. Thus multiplexing facilitates miniaturization. Also, because the dye is spectra absorbing, the color contrast does not diminish regardless of the viewing angle. Additionally, the switching voltage and more importantly, the mean power consumption is minimal.

Electrochromic optical display cells thus promise a significant advantage in cost and size over other display techniques heretofore used. However, electrochromic cells presently known in the art suffer from disadvantages and limitations which render them of a diminished value in self-contained display applications such as a digital watch display.

In the heretofore known display cell, a reference electrode is required in addition to the display electrode, and the counter electrode. The reference electrode establishes and then maintains the threshold potential during the plating of the dye. Maintenance of the threshold potential is required to form the insulating film on the cathode. Additionally, this potential stabilizes the reversibility of the reduced dye by preventing formation of irreversible products.

The reduction of the dye will not proceed unless the applied voltage is greater than the sum of the half cell potentials of the cell. Thus, an applied voltage approximately equal to the threshold potential facilitates rapid reduction of the dye. Thus, in heretofore known cells, the reference electrode is required to provide color contrast, acceptable writing times, and prevent the irreversible reduction of the dye.

Recently, a cell has been developed wherein a non-polarizable electrode simultaneously maintains the threshold voltage while providing charge transfer to electrolytically reduce the dye during the write cycle or oxidize the dye during the erase cycle. Thus, this single non-polarizable electrode performs the functions previously performed by two electrodes, i.e., the reference electrode and the counter electrode. Such a cell is described in co-pending application Serial Number 507,912, filed Sept. 20, 1974, by Raymond J. Jasinski et al, for Single Reference And Counter Electrode For An Electrochromic Display, the disclosure of which is incorporated herein by reference.

The non-polarizable counter electrode functioning in this dual capacity forms a half cell, which reversibly undergoes oxidation and reduction during the write and erase cycles. Non-polarizable counter electrodes, and more particularly the half cells, have high charge transfer efficiencies, some approaching 99.999%. However, continually cycling the cell degenerates the electrochemical potential of the electrode. For example, cells with efficiencies approaching 99.999% have been shown to retain only 8% of their original electrochemical capacity after 6 months of continuous 1 minute cycling. Further, contaminants and air leaks, which inevitably occur even in the most careful production practices, tend to chemically degenerate the electrodes.

In the present invention, an electrochemical optical display cell is regenerated through a regeneration electrode to restore the coulombic capacity of the cell, thus providing cell longevity and overcoming the disadvantages previously mentioned. In accordance with the broader aspects of the invention an electrode is disposed in an electrochromic optical display cell to electrolytically restore the coulombic capacity of the counter electrode without deleteriously affecting cell operation.

In one embodiment, the regeneration electrode is the display electrode normally present in the display cell, thus eliminating the need for a third separate electrode. In accordance with this embodiment, a regeneration voltage is applied across the counter electrode and the display/regeneration electrode such that the display/regeneration electrode becomes the anode. The voltage utilized for regeneration is in excess of normal voltages applied to oxidize the reduced dye. The substance reduced at the counter electrode is the n-heptyl-viologen cation In a preferred embodiment, the regeneration electrode is palladium. The palladium electrode undergoes oxidation during regeneration producing palladium oxide which is non-deleterious to cell operation.

The invention and further advantages thereof will be better understood by reference to the following detailed description of illustrative embodiments taken in conjunction with the accompanying drawings in which:

FIG. 1 is a schematic of an electrochromic display cell in accordance with one embodiment of the instant invention;

FIG. 2 is a schematic of the display cell in accordance with a preferred embodiment;

FIG. 3 is a top view of an electrochromic optical display cell in accordance with a further embodiment of the invention; and FIG. 4 is an elevation sectional view of the cell of FIG. 3 taken along lines 4—4.

Referring now to the drawings, and specifically to FIG. 1, there is illustrated generally an electrochromic optical display cell of the instant invention wherein a counter electrode is regenerated upon application of a regeneration potential between a regeneration electrode and the counter electrode of the cell. Specifically, a cell 10 contains a gold display electrode 12 which is connected to one side of a switch 20 at a contact 21; a palladium hydride counter electrode 14 connected to the same side of switch 20 at contacts 18 and 19 and simultaneously to one side of switch 24 at contact 26; and a gold regenerating electrode 22 connected to the same side of switch 24 at contact 25. The other side of switch 20 is connected to a battery 28, while the other side of switch 24 is connected to a battery 29. Sealed within cell 10, is fluid electrolyte solution consisting of water, an n-heptylviologen cation, a dihydrogen phosphate anion and a potassium dihydrogen phosphate salt buffer.

In operation, switches 24 and 20 are initially in the neutral position. A potential is applied across the cell such that the display electrode 12 is a cathode by positioning switch 20 to apply the battery 28, across contacts 19 and 21. The cell will then "write" by reversibly reducing the soluble colorless dye to the radical cation of n-heptylviologen dihydrogen phosphate. The reduced dye is deposited as an insoluble, insulating, colored film on the display electrode 12. When the circuit is opened by positioning switch 20, i.e., no electromotive force (emf) is applied across the cell, the dye remains reduced as the film. When the switch 20 is positioned to apply the battery 28 across contacts 18 and 21 such that the display electrode is the anode, the radical cation film is reversibly oxidized back to the n-heptylviologen cation and the dihydrogen phosphate anion. The cation is a colorless soluble dye, thus the display is "erased".

After the display has been "written" and "erased" many times, the switch 20 is placed so that the circuit is open, i.e., no electromotive force is applied across the cell by battery 28. Switch 24 is then positioned so that battery 29 is applied across contacts 25 and 26. Thus, the emf of battery 29 is applied between the counter electrode 14 and the regeneration electrode 22 such that the counter electrode 14 is the cathode.

The cell will regenerate by reducing palladium/palladium hydride, thus restoring the coulombic capacity of the cell. After complete regeneration has occurred, switch 25 is again moved to the open position and the display cycling commenced as previously described.

More specifically, cell 10 is constructed of a transparent electrochemically inert substance such as a clear plastic, glass, and the like. The inside of the cell defines a volume. The defined volume has gas/liquid integrity.

Disposed within the volume of cell 30 and bonded to the back wall thereof is the counter electrode 14, consisting of a thin coat of palladium hydride. Electrically insulated from the palladium hydride coat is the display electrode 12. The display electrode 12 is a thin coat of gold. Additionally, disposed within the volume of cell 10 is a gold regeneration electrode 22, which is electrically insulated from electrodes 12 and 14.

The display electrodes that may be used in accordance with the invention are metallic substances which will not form insoluble salts during electrolysis and will not be solubilized by the electrolyte. Gold is preferred.

The counter electrode 14, as the anode during the write cycle, electrolytically liberates an electron to yield a hydrogen ion (hydronium) and elemental palladium. This half reaction has an oxidation reduction potential $E°$ of about +50 millivolts with respect to a conventional hydrogen electrode in the same solution. The potential is thus substantially constant over a concentration ratio of H to Pd from about 0.03 to 0.6. Further, the counter electrode is essentially non-polarizable.

Polarization of reversible electrodes is a well known phenomena wherein the redox potential of a half cell for a given concentration will vary upon application of an external emf during electrolysis. Such potential disturbances are generally called "electroyltic polarization". It has been found that the palladium/palladium hydride half cell redox potential is substantially immune to this phenomena over the range of operating current required to reduce the n-heptyl-viologen cation. Therefore, by using the palladium hydride counter electrode, and more particularly, the palladium/palladium hydride half cell reaction during electrolysis, the equilibrium potential is essentially maintained throughout the reduction, as well as the oxidation of the n-heptylviologen dye. Thus, the use of a palladium hydride counter electrode allows maintenance of a substantially constant threshold potential throughout a write or erase cycle.

Moreover, it has been found that the oxidation and reduction of the palladium hydride electrode itself is electrochemically efficient. That is, the electrode reversibly undergoes oxidation and reduction without substantial loss of electrochemical potential. The efficiency of the palladium hydride electrode has been shown to be about 99.995% in environments free of outside oxidation or reduction agents.

The charge transfer reaction of the half cell is as follows:

$$Pd + H_2O + e^- \rightarrow PdH + OH^-$$

The concentration of the palladium hydride in the Pd/PdH half cell is preferably that concentration consistent with a nominal 50 millivolt electrolysis voltage. Specifically, the concentration ratio of H to Pd is preferably kept less than about 0.03 to prevent reduction of the n-heptylviologen cation. Further, the half cell is self controlling within the desired threshold voltage ranges. Higher concentration ratios of H to Pd reduce the n-heptylviologen ion as follows: PdH + n-heptylviologen cation → Pd + n-heptylviologen film. Film formation inhibits a further palladium hydride n-heptylviologen cation reaction, thus stabilizing the potential.

The counter electrode half cell that can be regenerated in accordance with the instant invention preferably has a half cell redox potential which is substantially immune to polarization over the range of operating currents required to reduce the dye within the electrochromic display cell. In addition to the palladium/palladium hydride half cell, the lead-lead phosphate half cell and the n-heptylviologen cation/n-heptylviologen reduced radical cation half cell are the preferred non-polarizable half cells.

The regenerating electrode 22 is formed of palladium and not attached to the back wall of cell 10. The electrode 22 protrudes into the electrolyte solution directly above the counter electrode 14. Thus, the reference electrode 22 is not visible in the area of the display electrode 12. The regeneration electrode may be formed of any material which will function as an anode within the electrolyte without deleteriously affecting the operation of the display cell. A preferred regeneration electrode is formed of lead. More preferably, the electrode is formed of a palladium material which can either be pure palladium or a palladium alloy. Both lead and palladium are preferred in that the voltage required to regenerate the cell is minimal. For example, regeneration voltages, when using palladium or lead regenerating electrodes, is in the range of about 700 millivolts, whereas, an emf of 1.50 to about 1.80 is required for oxidation of the n-heptylviologen cation when the gold regeneration electrode is used. When utilizing the lead regeneration electrode, a lead phosphate is formed during the regeneration cycle. The lead phosphate is not well defined but is believed to be $Pd_3(PO_4)_2$.

The phosphate thus formed is dissolved to a minor extent in the electrolyte. Likewise, when palladium is utilized, palladium oxide is formed during the regeneration cycle. Neither the lead phosphate nor the palladium oxide is deleterious to cell operation. Tantalum may also be utilized as the regeneration electrode material, however, it has been shown to have a limited capacity. Further, several regeneration electrodes have been shown to solubilize after limited cell cycling causing deleterious deposits to form in the cell.

The electrolyte is hermetically contained in the volume defined by the cell 30. Thus, the electrolyte is in intimate contact with electrodes 36 and 32 and is non-deleterious to the palladium/palladium hydride half cell. The electrolyte contains a cation of n-heptylviologen having the following structure:

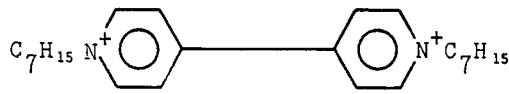

and an anion of dihydrogen phosphate ($H_2PO_4^-$); water, and a potassium dihydrogen phosphate salt which acts as a buffer. The amount of the buffer salt in solution will determine the concentration of the n-heptylviologen cation. For example, when the buffer is 2 molar, the cation concentration is from about .14 molar to about .16 molar. In a 3 molar buffer solution, the cation concentration is from about .04 molar to about .05 molar. It has been found that solutions with concentrations greater than about 90% of saturation wherein saturation is determined by the n-heptylviologen ion salt concentration in the water/dihydrogen phosphate solution are unstable. The concentration of the buffer salt within the solution is from about 1 molar to about 3 molar.

The electrolytes used in accordance with the invention will combine with the n-heptylviologen cation during reduction to reduce an insoluble, insulating, colored film. Additionally, the anion is preferably otherwise substantially inert, i.e., will not solubilize the display electrode nor form insoluble salts during electrolysis.

In the preferred electrolyte used in accordance with the invention, n-heptylviologen bromide is initially prepared by reacting dipyridyl and n-heptylbromide. Then, through an anion exchange process, the dihydrogen phosphate ($H_2PO_4^-$) is substituted therefor. The resulting electrolyte is substantially pure dissociated solution of n-heptylviologen dihydrogen phosphate. Traces of n-heptylviologen bromide may remain because of the inability to effect complete anion substitution. Preferably the electrolyte contains less than about $10^{-5}$ molar bromide anion. The bicarbonate ($HCO_3^-$) anion also can be substituted for the bromide, yielding n-heptylviologen bicarbonate. This electrolyte and the process for anion substitution is disclosed in co-pending application Ser. No. 507,895, filed Sept. 20, 1974, by Raymond J. Jasinski, for Electrolytes for Electrochromic Display Cells, the disclosure of which is herein incorporated by reference.

The bicarbonate anion may be used in accordance with the invention, however, it is not preferred. Specifically, it has been found that the pH of the electrolyte must be maintained in a range from about 7.8 about 8.0 to assure the stability of the bicarbonate anion. Specifically, it has been found that at pH's lower than about 7.8, the bicarbonate anion combines with a hydrogen ion and decomposes liberating carbon dioxide and water. Since the pH range at which the cation dye operates most effectively are below 7.8, the bicarbonate anion can be used as the anion of the electrolyte only at the sacrifice of dye performance.

The electrolytes used in accordance with the invention need contain the n-heptylviologen cation, water, and an anion which will combine with the n-heptylviologen cation during reduction to produce an insoluble, insulating, colored film. Additionally, the anion is preferably otherwise substantially inert, i.e., will not solubilize the display electrode nor form insoluble salts during electrolysis.

The electrolyte previously used in electrochromic cells contained a bromide anion (n-heptylviologen bromide). It has been found, however, that the bromide ion is not a preferred anion and specifically, that concentrations greater than about $10^{-4}M$ or $10^{-5}M$ tend to solubilize silver and gold anodes, respectively, after long periods of cell operation. Further, it has been determined that during repeated erase and write cycles, the bromide ion tends to cause a "hysteresis" effect on the display electrode. The hysteresis effect, characterized by reddish-brown spots on the electrode must be "erased" by applying a large reverse potential across the cell. This large reverse potential itself is deleterious to the cell in that it produces black blemishes on the display electrode which cannot be erased, exhausts the electrochemical potential of the electrode and solubilizes the electrode material.

Additionally, electrolytes in accordance with the invention contain a substance that undergoes oxidation in electrochemical process which takes place at the regeneration electrode to balance the charge within the cell during regeneration. The substance does not deleteriously affect the display activity. In the absence of solubilizing ions, such as bromide, the dye itself may be oxidized at the regeneration electrode. Thus, no further substances need be carried in the electrolyte. Since the electrolyte contained in the cell 10 has dihydrogen phosphate anions which have been substituted for the bromide anion, the oxidation reaction taking place within the cell at the regeneration electrode is the oxidation of the reduced n-heptylviologen.

In accordance with the preferred embodiment, the regeneration electrode is itself oxidized during regeneration. Examples of substances that can be used as regeneration electrodes without deleteriously affecting cell operation upon oxidation are tantalum and silver, palladium, and lead. As previously more fully described, lead and palladium are preferred regeneration electrodes.

The battery 42 may be any type known in the art, such as a dry cell, an alkaline cell, or the like. The power required to reduce the n-heptylviologen cation is from about 2 to about 4 millijoules per square centimeter of display electrode surface.

The battery 29 may also be any type known in the art, such as a dry cell, an alkaline cell, or the like. The emf required from the battery is preferably from about 0.5 volts to about 1.8 volts, depending upon the regeneration electrode used. The charge capacity required to regenerate the palladium hydride electrode is from about 0.5 millicoulombs to about 2.0 millicoulombs.

In operation, the cell 10 is normally in a stable erase state. The n-heptylviologen is the soluble, colorless cation. To write, the switch 20 is positioned such that the battery 28 is applied across contacts 19 and 21. The display electrode 12 thus becomes a cathode, while the counter electrode 14 becomes an anode. An electrolysis current applied through the cell reduces the n-heptylviologen cation at the display electrode to an insoluble anion radical cation complex that markedly absorbs visible light.

During the write cycle, the film forming on the display electrode increases the resistance of the electrode, changing the ohmic characteristics of the cell. The palladium/palladium hydride half cell, however, maintains a substantially constant oxidation reduction potential throughout the film forming process. Thus, the insoluble colored film continues to form on the display electrode at a relatively rapid rate.

Switch 20 is then placed in a neutral position such that the potential of battery 28 is not applied across any of the contact points. Thus, no emf is applied across the cell. The reduced dye remains in its colored state. The cell could maintain the electrochromic "optical display" once written, for an indefinite period; however, oxidizing contaminants such as air and the like, tend to deteriorate the colored film in time.

The display is erased by placing the switch 20 so as to apply to the battery 28 across contacts 18 and 21. The display electrode becomes the anode of the cell. At the display electrode then, the insoluble colored film is reversibly oxidized to the colorless soluble cation. The written display is thus erased.

The following reactions, which are advanced herein for clarity and not meant as a limitation, are believed to proceed within the cell wherein:

$V^{++}$ n-heptylviologen cation (colorless soluble form)
$V.^+$ is the reduced n-heptylviologen radical cation (colored insoluble film form)
$X^-$ is the anion During the write cycle
1. At the display electrode (cathode)

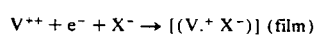
$V^{++} + e^- + X^- \rightarrow [(V.^+ X^-)]$ (film)

2. At the counter electrode (anode)

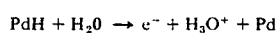
$PdH + H_2O \rightarrow e^- + H_3O^+ + Pd$

During the erase cycle
1. At the display electrode (anode)
$(V.^+ X^-) \rightarrow e^- + V^{++} + X^-$
2. At the counter electrode (cathode)

$Pd + H_3O^+ + e^- \rightarrow Pd + H_2O$

It will be realized by those skilled in the art that reversing the current flow across the cell to oxidize the insoluble colored film at the display electrode 12 may simultaneously cause reduction of the soluble cation dye at the cathode counter electrode 14. Thus, the counter electrode must in some way be "masked" (not shown) such that the colored dye being reduced at the counter electrode during the erase mode will not be visible to the display reader. The masking can be accomplished by any known means in the art.

The procedure of writing and erasing the display may be cycled continuously. The palladium hydride electrode, and more particularly the palladium/palladium hydride half cell, is electrochemically efficient, being easily and reversibly oxidized and reduced. Further, the electrode provides a threshold potential throughout the oxidation and reduction cycle, in addition to eliminating the reference electrode which requires additional power sources and complicated operational amplifiers. The insoluble colored film, forms rapidly at the display electrode during a write cycle and erases rapidly during an erase cycle with a minimum switching voltage and a low mean power consumption.

After the cell has been cycled until the counter electrode is sufficiently degraded, the switch 20 is moved to the neutral position such that no emf is applied across the cell and switch 24 is moved into position such that the emf of battery 29 is applied across contacts 26 and 25.

At the counter electrode, which is the cathode of the new cell produced by the introduction of the regenerating current, palladium metal is reduced with a hydrogen ion to form palladium hydride. The formation of palladium hydride regenerates the coulombic capacity of the counter electrode. Additionally, the small amounts of the n-heptylviologen cation are reduced at the counter electrode forming the insoluble colored film. Such film formation is not deleterious to the cell nor optically descernible to a display reader.

At the regeneration electrode, the dye is oxidized. If other ions are present which have been introduced specifically for use in the regeneration cycle, these ions are also oxidized at the regeneration electrode. It has been found that in accordance with the invention, oxidation products generated by regenerating the palladium hydride electrode will not react with the reduced dye to erase the display during subsequent cycling. Thus, a hermetically sealed electrochromic display cell may be electrochromically regenerated without deleteriously affecting the display operation.

The regeneration sequence is preferably triggered as the function of cell operating time. Thus, after a specified number of erase-write cycles, the switch 24 is moved from its normal operating open position to apply a regenerating current to the cell. Once regeneration has occurred, the switch is again placed in the open position and normal cycling of the display commenced. Regeneration may also be commenced by measuring the internal impedance of the cell. As the coulombic capacity of the counter electrode slowly degrades, the redox potential of the cell will change. Thus, any means known in the art for measuring this voltage variation may be utilized to trigger the regeneration cycle.

In another embodiment in accordance with the instant invention, as shown in FIG. 2, a cell 30 contains a gold display electrode 32 and a palladium hydride counter electrode 36. The electrode 32 functions as both the display electrode and as the regenerating electrode of the electrochromic display cell.

The display cell 30 is substantially identical to display cell 10 with the notable absence of a separate regenerating electrode. Additionally, the electrolyte contained within the volume defined by cell 30 is identical that of cell 10.

Likewise, the switching circuitry and battery utilized to apply the display operation potential across the cell are similar. Specifically, display electrode 32 is connected to contact 39 on one side of switch 34. Counter electrode 36 is connected simultaneously to contacts 38 and 40 on the same side of switch 34. The other side of switch 34 is connected to a battery 42.

The regeneration potential for cell 30 is supplied by utilizing battery 42 in series with battery 50 by means of a single pole, double throw switch 52. In operation, the regeneration mode proceeds as switch 34 is positioned such that counter electrode 36 is a cathode. Switch 52 is then reversed, resulting in an applied voltage from about 1.3 to about 1.8 volts. The gold electrode 32 functions both as a regenerating electrode and as the display electrode during reverse electrolysis of the dye.

It will be realized by those skilled in the art that reversing the current flow in the cell to oxidize the insoluble colored film at the display electrode 32 causes reduction of the soluble cation dye at the cathode counter electrode 36. Thus, the counter electrode must in some way be "masked" (not shown) such that the colored dye being reduced at the counter electrode during the erase mode will not be visible to the display reader. The masking can be accomplished by any means known in the art.

Further, the display electrode may be transparent such as a thin layer of gold coated on the inside of the transparent covering on the cell. Thus, the reduced dye will be formed on the underside of the electrode, i.e., the side opposite the observer. The reduced dye is thus optically discernible through the display electrode itself. When utilizing this embodiment, the display electrode masks the counter electrode such that the colored dye being reduced at the counter electrode during the erase cycle is not visible.

Another embodiment in accordance with the instant invention is shown in FIG. 3. Specifically, a cell 130, as better shown in FIG. 4, includes an insulating plastic back wall 140 and a transparent glass front wall 142. Bonded to the back wall 140 is a palladium hydride coating which forms the counter electrode 136. Electrically insulated from the counter electrode 36, and from each other by a series of gaps 144, is display electrodes 132.

As is best shown in FIG. 3, the display electrodes 132 are connected through a series of switches 146a through 146x, inclusive, to contacts 148 and 150 on one side of switch 134 and to contact 160 on one side of switch 164. Counter electrode 136 is connected to contacts 152 and 154 on one side of switch 134 and to contact 162 on one side of switch 164. Connected to the other side of switch 134 through two pairs of contacts is a battery 143. The other side of switch 164 is connected to regenerating battery 166 such that upon closing switch 164 the counter electrode becomes the cathode of the cell.

Referring again to FIg. 4, an electrolyte identical to that previously described in accordance with the invention, is contained within the volume 164. The electrolyte is visible through transparent front wall 142. The electrolyte completely fills the volume 164, including the gaps 144 separating the various electrodes.

In operation, a series of switches 146a through 146x are selectively opened and closed to a complete circuit between the contacts 154 and 152 on one side of switch 134. For example, to display the digital representation of three o'clock, the following switches would be closed: 146b, 146c, 146d, 146v, 146u, 146e, 146t, 146f, 146h, 146i, 146s, 146r, 146q, 146j, 146l, 146m, 146n, 146o and 146p. To write "three o'clock", switch 134 is positioned so that the battery 142 is applied across contacts 150 and 156.

Only one counter electrode is needed. The selected display electrodes will reduce the dye to the insoluble film as previously described. Each display electrode energized will be visible, forming a display pattern: 3:00. Once the write cycle is completed, the switch 34 is positioned to open the circuit. The display will remain visible until erased. To erase the digital representation of "three o'clock", the switch 134 is positioned such that battery 143 is applied across contacts 152 and 148. Switches 146a through 146x can then be positioned to write 3:01. Battery 143 is then applied across contacts 150 and 154 as previously described.

As previously discussed herein, the palladium hydride counter electrode and more particularly the palladium/palladium hydride half cell is non-polarizable, thus maintaining a constant potential. The half cell potential can thus be used as the reduction potential by shorting the counter electrode to the display electrode. The electrochromic cell may be written or erased depending upon the redox potential of the half cell by shorting the non-polarizable counter electrode to the display electrode. Thus, no additional external current is required.

After the cell has been cycled to write and erase many times such that the cell coulombic capacity becomes degraded, the regeneration mode is triggered by a method as previously described. In the regeneration mode, all the switches 146a through 146x are closed to give a regeneration electrode with maximum surface area. Switch 134 is positioned open. The switch 164 is then closed to apply the potential of battery 166 across cell 130. As previously described, the n-heptylviologen cation is reduced at the counter electrode while the n-heptylviologen radical cation is oxidized at the display electrode.

When the cell is sufficiently regenerated, switch 164 is positioned open and the display cycle continues as previously described. Thus, an electrochromic digital display cell may be regenerated in accordance with the invention to provide cell operating longevity.

The following is illustrative of the instant invention. An electrochromic cell containing a single counter electrode as described above was prepared as follows:

Au (display)/0.11 M n-heptylviologen salt, lMKH$_2$PO$_4$/PdH/Pd (counter)

This cell was operated as previously described by applying an electrolysis voltage of −150 millivolts to write the display and a voltage of +360 millivolts to erase. The cell was operated for over 4×10$^{+6}$ cycles with good contrast and complete erasure.

Further, the cell displayed no sign of hysteresis. The mean power requirement was approximately 2 millijoules/cm$^2$ of display electrode surface to be coated. Additionally, periodically during the operation at intervals of from about $0.2\times10^{-6}$ cycles to about $1.0\times10^{-6}$ cycles, the palladium hydride electrode was regenerated as previously described. The regeneration voltage was from 1.3 to about 1.8 volts. The regenerated electrode did not show signs of oxidizing the reduced n-heptylviologen radical cation when the write cycle was commenced immediately after regeneration.

While the invention has been explained in relation to its preferred embodiment, it is to be understood that various modifications thereof will now become apparent to those skilled in the art upon reading the specification and it is intended to cover such modifications as fall within the scope of the appended claims.

What is claimed is:

1. An electrochromic display cell comprising:
   a. a cell structure means defining a sealed volume;
   b. an electrolyte composition completely filling said volume comprising water, an anion, and an n-heptylviologen cation which when reversibly reduced combines with said anion to produce an insoluble insulating adherent film that markedly absorbs visible light;
   c. a first electrode contained in said cell structure means and contacting said electrolyte forming a reversible half cell in said electrolyte;
   d. a second electrode electrically insulated from said first electrode, contained in said cell structure means and contacting said electrolyte;
   e. a third electrode for transferring a regeneration charge electrically insulated from said first and second electrodes, contained in said cell structure means and contacting said electrolyte;
   f. means for applying an electrical voltage across said cell to effect an electrolytic current flow to alternatively write and then erase said electrochromic display; and
   g. means for applying a regeneration current across said cell such that said third electrode is an anode to restore the coulombic capacity of said first electrode.

2. The cell of claim 1 wherein said anion is dihydrogen phosphate, and wherein said electrolyte further contains a buffered salt from a group consisting of potassium dihydrogen phosphate and sodium dihydrogen phosphate in concentrations of from about 1.0 molar to about 3.0 molar.

3. The cell of claim 1 wherein said first electrode is palladium hydride forming a palladium/palladium hydride half cell and wherein said second electrode is gold.

4. The cell of claim 3 wherein the concentration ratio of hydrogen to palladium in said palladium/palladium hydride half cell is from about 0.03 to about 0.6.

5. The cell of claim 1 wherein said cell structure has at least one transparent wall and wherein said first electrode and said second electrode are bonded to a cell surface opposite said transparent wall.

6. The cell of claim 1 wherein said means for reversing said current flow across said cell comprises a circuit for shorting said first electrode to said second electrode.

7. The cell of claim 1 wherein said third electrode is gold and said n-heptylviologen cation is oxidized during regeneration.

8. The cell of claim 1 wherein said third electrode is selected from a group consisting of palladium, lead, tantalum and silver.

9. An electrochromic display cell comprising:
   a. a cell structure comprising a first opaque nonconducting back wall, and a second transparent nonconducting front wall, said back wall and said front wall defining a sealed volume;
   b. an electrolyte composition completely filling said volume comprising water, a dihydrogen phosphate anion and an n-heptylviologen cation which when reversibly reduced combines with said anion to produce an insoluble insulating adherent film that markedly absorbs visible light and a buffer salt from a group consisting of sodium dihydrogen phosphate and potassium dihydrogen phosphate;
   c. a first electrode of a thin coat of palladium hydride bonded to said back wall of the cell structure and intimately contacting said electrolyte;
   d. a second electrode of a thin coat of gold intimately contacting said electyrolyte, and electrically insulated from said first electrode;
   e. a third electrode of gold intimately contacting said electrolyte and electrically insulated from said first and said second electrodes in said cell structure;
   f. a battery for supplying a voltage across said cells to effect current flow between said first electrode and said second electrode to reversibly write or erase said electrochromic display; and
   g. a battery for supplying a voltage across said cell to effect a regeneration current flow between said first and said third electrode such that the coulombic capacity of said first electrode is regenerated.

10. An electrochromic display cell comprising:
    a. a cell structure means defining a sealed volume;
    b. an electrolyte composition completely filling said volume comprising water, an anion, and a n-heptylviologen cation which when reversibly reduced combines with said anion to produce an insoluble insulating adherent film that markedly absorbs visible light;
    c. a first electrode contained in said cell structure means and contacting said electrolyte forming a reversible half cell;
    d. a second electrode electrically insulated from said first electrode, contained in said cell structure means and contacting said electrolyte;
    e. means for applying an electrical voltage across said cell to effect an electrolytic current flow to alternatively write and then erase said electrochromic display; and
    f. means for applying a regeneration current across said cell such that said second electrode is an anode to restore the coulombic potential of said first electrode.

11. The cell of claim 10 wherein said anion is dihydrogen phosphate, and wherein said electrolyte further contains a buffered salt from a group consisting of potassium dihydrogen phosphate and sodium dihydrogen phosphate in a concentration form about 1.0M to about 3.0M.

12. The cell of claim 10 wherein said first electrode is palladium hydride forming a palladium/palladium hydride half cell and said second electrode is gold.

13. The cell of claim 12 wherein the concentration ratio of hydrogen to palladium in said palladium/palladium hydride half cell is from about 0.03 to about 0.6 and wherein the concentration of n-heptylviologen cation is from about .04M to about .16M.

14. The cell of claim 10 wherein said cell structure has at least one transparent wall and wherein said first electrode and said second electrode are bonded to a cell surface opposite said transparent wall.

15. The cell of claim 10 wherein said means for reversing said current flow across said cell comprises a circuit for shorting said first electrode to said second electrode.

* * * * *